United States Patent [19]

Noguchi et al.

[11] Patent Number: 5,355,263
[45] Date of Patent: Oct. 11, 1994

[54] ROTARY HEAD TYPE MAGNETIC TAPE APPARATUS

[75] Inventors: Masayoshi Noguchi, Chiba; Makoto Yamada, Tokyo, both of Japan

[73] Assignee: Sony Corporation, Tokyo, Japan

[21] Appl. No.: 585,485

[22] Filed: Sep. 20, 1990

[30] Foreign Application Priority Data

Dec. 30, 1989 [JP] Japan ................. 1-340273
Dec. 30, 1989 [JP] Japan ................. 1-340275
Dec. 30, 1989 [JP] Japan ................. 1-340276

[51] Int. Cl.$^5$ .................. G11B 21/04; G11B 15/46
[52] U.S. Cl. ......................... 360/70; 360/73.02; 360/73.04
[58] Field of Search ......... 360/69, 70, 73.02–73.04; 242/186

[56] References Cited

U.S. PATENT DOCUMENTS 4,626,936 12/1986 Yoshino .
4,777,413 10/1988 Yoshimura et al. .
4,794,473 12/1988 Kawasaki .
4,956,730 9/1990 Arai et al. .......................... 360/70
4,996,611 2/1991 Ito ................................. 360/72.3

FOREIGN PATENT DOCUMENTS

0180432A3 5/1986 European Pat. Off. ..... G11B 20/10
0197782A1 10/1986 European Pat. Off. ..... G11B 20/10
0254511A3 1/1988 European Pat. Off. ..... G11B 15/18
0322119A3 6/1989 European Pat. Off. ... G11B 15/467

*Primary Examiner*—Aristotelis Psitos
*Assistant Examiner*—Varsha V. Sheladia
*Attorney, Agent, or Firm*—Limbach & Limbach

[57] ABSTRACT

A rotary head magnetic tape apparatus, in which a take-up reel is driven in a controlled manner so that the detected tape running speed is equal to a reference tape running speed corresponding to preset tape speed data, and the rotary drum is driven in a controlled manner so that the detected drum rotating speed is equal to a reference drum rotating speed associated with the preset tape speed data, such that the speed of a track the magnetic tape relative to the magnetic head provided on the rotary drum may be accurately maintained.

2 Claims, 7 Drawing Sheets

ROTARY HEAD TYPE MAGNETIC TAPE APPARATUS

BACKGROUND OF THE INVENTION

1. Field of the Invention

This invention relates to a rotary head type magnetic tape apparatus which may be advantageously applied to, for example, a digital audio tape recorder.

2. Related Art Statement

A rotary head digital tape recorder (DAT) has been used as a tape recorder capable of performing high density recording of audio signals.

With a DAT, input audio data may be recorded, using a rotary head or heads provided on a rotary drum, on a magnetic tape placed at a predetermined wrapping angle on the drum, or the audio data previously recorded on the magnetic tape may be reproduced using the same magnetic head or heads.

To record or reproduce audio data with a DAT, it is necessary to control the speed with which the recording track on the magnetic tape passes the rotary head or heads. Previously this has been done by detecting the relative speed between the magnetic tape and the rotary head or heads from the frequency of reproduced clock signals contained in the reproduced signals.

With this relative speed controlling method, the reproduced signals obtained upon scanning the magnetic tape are input to a phase locked loop (PLL) type clock reproducing circuit, the relative speed between the magnetic tape and the rotary head or heads is detected on the basis of the frequency of the reproduced clock signals contained in the reproduced signals, and the number of revolutions of the rotary drum is controlled so that this relative speed will be maintained at a constant value.

However, in this type of control method, while the relative speed between the tape and the head may be kept constant during normal recording or reproducing operations, relative speed detection cannot be achieved when the PLL in the clock signal reproducing circuit is not locked and hence the reproduced clock signal cannot be obtained, for example, during starting of the tape or during high-speed search operation.

OBJECT AND SUMMARY OF THE INVENTION

It is a principal object of the present invention to provide a rotary head magnetic tape apparatus in which the speed of the magnetic tape past the rotary head or heads may be kept constant by means of simplified construction and without resorting to reproduced signals.

The present invention provides a rotary head magnetic tape apparatus in which the take-up reel is driven in a controlled manner so that the detected tape running speed will be equal to a reference tape running speed, corresponding to a preset tape speed, and in which the rotary drum is driven in a controlled manner so that the detected drum rotating speed will be equal to a reference drum rotating speed associated with the tape speed.

The other objects and advantages of the present invention will become apparent from the following description of the preferred embodiments of the present invention.

DETAILED DESCRIPTION OF PREFERRED EMBODIMENTS

Figure 1:
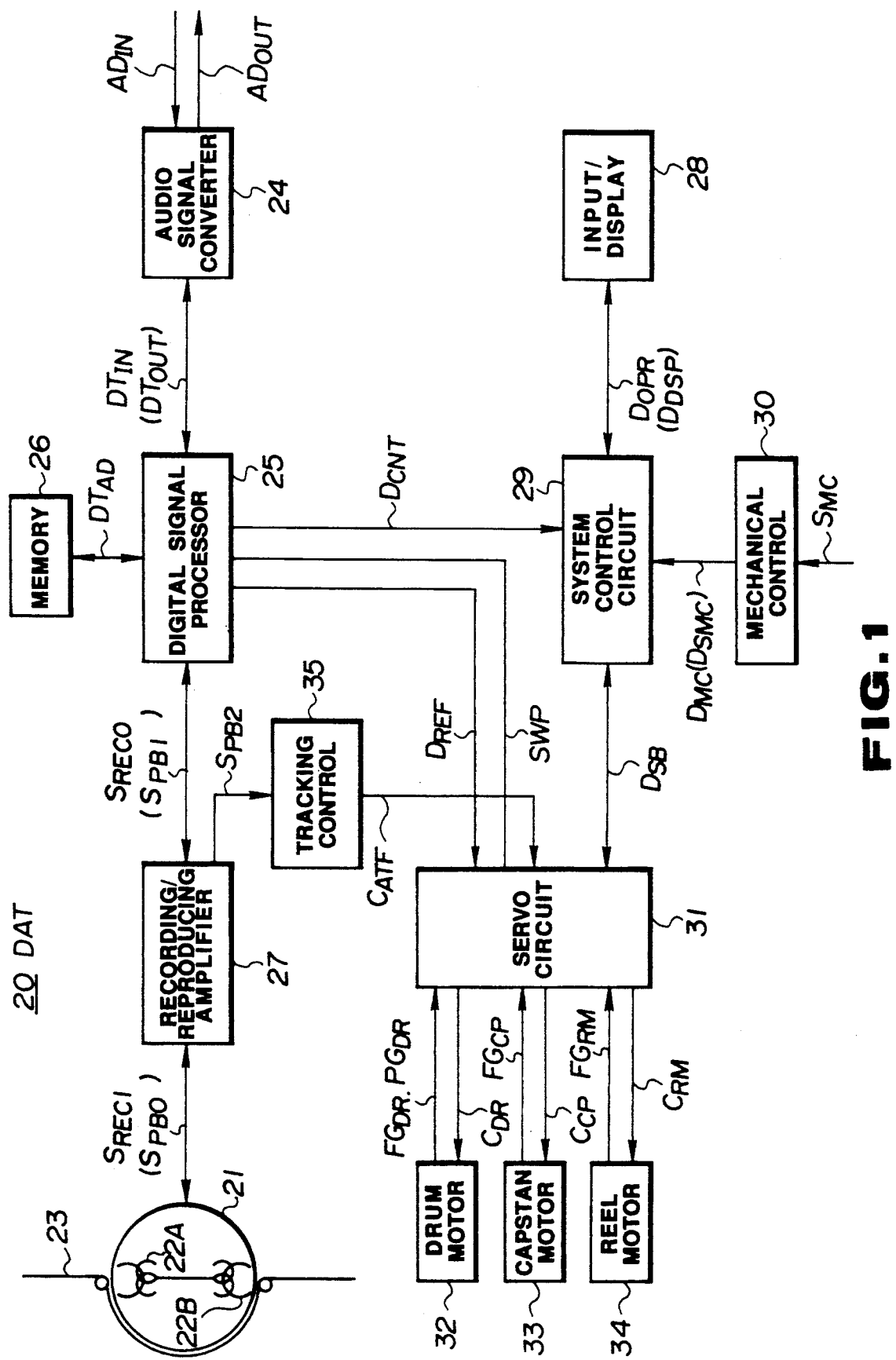
FIG. 1 is a block diagram showing the rotary head magnetic tape apparatus in its entirety.

Before proceeding to a concrete embodiment of a rotary head type magnetic tape apparatus according to the present invention, a rotary head type digital audio tape recorder (DAT), to which the rotary magnetic tape apparatus is applied, is explained by referring to FIG. 1.

In such a rotary head digital audio tape recorder (DAT) 20, desired audio signals $AD_{IN}$ and $AD_{OUT}$ are adapted to be recorded on or reproduced from a magnetic tape 23 which is wrapped over a predetermined angle on a rotary drum 21 with the aid of magnetic heads 22A and 22B provided on the rotary drum 21.

During recording, the input audio signals $AD_{IN}$ are entered into an audio signal converter 24 of DAT 20. The audio signal converter 24 has a low-pass filter and an analog-to-digital converter for recording, and causes the input audio signals $AD_{IN}$ to be converted into digital data, which is then transmitted to a digital signal processing circuit 25 as input digital data $DT_{IN}$.

The digital signal processing circuit 25 causes the input digital data $DT_{IN}$ to be written temporarily in a random access memory circuit (RAM) 26 as input audio data $DT_{AD}$.

For recording, the digital signal processing circuit 25 contains an error correction code generator, an interleaving circuit, an 8–10 modulation circuit and a parallel/serial converter.

The input audio data $DT_{AD}$ written into the memory circuit 26 is read out by the error correction code generator to produce an error correcting parity, which is then also written in the memory circuit 26.

For writing to and reading from the memory circuit 26, addresses generated in the interleaving circuit in association with data interleaving are selected, and the input audio data $DT_{AD}$ with the error correction parity affixed thereto is read by the 8–10 modulation circuit.

The 8–10 modulation circuit causes the input audio data $DT_{AD}$ consisting of 8-bit data to be converted into 10-bit data suited for magnetic recording by rotary heads 22A and 22B, while affixing sync signals, address signals, subcode signals and automatic track following (ATF) signals to the converted data.

The parallel/serial converter in the digital signal processing circuit 25 causes the produced input audio data $DT_{AD}$ to be converted into record signals $S_{RECO}$ formed by serial data prior to transmission thereof to a recording/reproducing amplifier 27.

For recording, the recording/reproducing amplifier 27 contains a record signal amplifier and a rotary transformer, not shown, and supplies record signals $S_{REC1}$, obtained by amplifying input record signals $S_{REC0}$, to rotary heads 22A and 22B on rotary drum 21 by means of the rotary transformer.

In this manner, the input audio signals $AD_{IN}$ may be recorded on a predetermined track on the magnetic tape 23.

With the above described DAT 20, the recording/reproducing operation may be selectively controlled with operating data $D_{OPR}$ which is input from an input/display circuit 28 to a system controller 29 of a microcomputer configuration.

The input/display circuit 28 is constituted by, for example, a microcomputer having a key matrix as an input means and a display panel having liquid crystal elements as a display means.

The input/display circuit 28 is responsive to the user's manipulation of the input means to generate operating data $D_{OPR}$, and also creates a display on the display means base upon display data $D_{DSP}$ from system controller 29.

During recording, the system controller 29 generates mechanical control data $D_{MC}$, signal processing control data $D_{CNT}$, and servo processing control data $D_{SB}$, on the basis of preset system data and operating data $D_{OPR}$ supplied from input/display circuit 28, and transmits these to a mechanical control circuit 30, a digital signal processing circuit 25 and a servo circuit 31, respectively.

During recording, the servo circuit 31 transmits a drum driving signal $C_{DR}$, a capstan driving signal $C_{CP}$ and a reel driving signal $C_{RM}$ to a drum motor 32, a capstan motor 33, and a reel motor 34, respectively, based on servo control data $D_{SB}$ supplied from system controller 29, to effect rotation of the rotary drum 21 at a predetermined rotating speed and movement of the magnetic tape 23 at a predetermined running speed.

At this time, a drum phase signal $PG_{DR}$, a drum frequency signal $FG_{DR}$, a capstan frequency signal $FG_{CP}$ and a reel frequency signal $FG_{RM}$ are fed back from drum motor 32, capstan motor 33 and reel motor 34 to the servo circuit 31 to create a velocity servo or phase servo.

An internal reference signal $D_{REF}$ indicating one interleaving period for recording is supplied to the servo circuit 31 from the digital signal processor 25, as a result of which the servo circuit 31 executes velocity servo or phase servo control operations on the basis of the internal reference signal $D_{REF}$, while transmitting a switching reference signal SWP for rotary heads 22A and 22B which is generated on the basis of the input drum phase signal $PG_{DR}$ and drum frequency signal $FG_{DR}$.

The mechanical control circuit 30 controls the operation of a DAT cassette loading mechanism and a loading mechanism for magnetic tape 23, on the basis of the mechanical control data $D_{MC}$ supplied from system controller 29, while providing mechanical control data $D_{SMC}$ to system controller 29 on the basis of the sensor data $S_{MC}$ input from the mechanical section.

For playback with the above described DAT 20, the servo circuit 31 causes rotation of the drum motor 32 at a rotation speed consistent with the servo control data $D_{SB}$ input from system controller 29 and at a phase timed to the internal reference signal $D_{REF}$ for reproduction which is supplied from the digital signal processing circuit 25 to constitute a velocity servo and a phase servo.

The playback signal $S_{PB0}$ obtained in this state from the rotary heads 22A and 22B is input to the aforementioned recording/reproducing amplifier circuit 27, which for playback contains a rotary transformer, a playback signal amplifier circuit, a waveform equalizer and an enclosed binary circuit. The resulting amplified playback signal $S_{PB2}$ is supplied to a tracking control circuit 35, whereas playback digital signal $S_{PB1}$, produced by means of the binary circuit, is supplied to the digital signal processing circuit 25.

The tracking control circuit 35 performs tracking control in accordance with, for example, an ATF system. That is, the tracking control circuit 35 includes an ATF envelope detection circuit and an equalizer circuit for sync signal detection and, based on the timing of detection of the sync signal in the playback digital signal $S_{PB1}$, detects the ATF signal in the detected envelope signal and generates an ATF control signal $C_{ATF}$ in accordance with the ATF signal which is transmitted to servo circuit 31.

This causes servo circuit 31 to drive capstan motor 33 in accordance with the ATF control signal $C_{ATF}$ to form an ATF servo loop to enable the rotary heads 22A and 22B to correctly follow the recording track on magnetic tape 23.

Once the system is prepared for reproduction the digital signal processing circuit 25 starts to reproduce the playback digital signal $S_{PB1}$.

For playback, the digital signal processing circuit 25 contains a clock regenerator of a phase locked loop (PLL) configuration, a 10-8 demodulating circuit, an error detection/correction circuit, a deinterleaving circuit and an interpolating circuit, not shown.

The digital signal processing circuit 25 first detects, in the clock regenerator, playback clock signals contained in the playback digital signal $S_{PB1}$.

On detection of sync signals in the playback digital signal $S_{PB1}$ the 10-8 demodulating circuit performs, on the basis of the playback clock signals detected in the clock regenerating circuit, a 10-bit demodulation of the playback digital signal $S_{PB1}$, and causes the produced 8-bit data to be written sequentially into the memory circuit 26 as playback audio data $DT_{AD}$.

The playback audio data $DT_{AD}$, thus written in the memory circuit 26, is read out by the error detection/correction circuit to detect the possible presence of data errors. Should data errors exist, the error detection/correction circuit performs error correction with the aid of the parity for error correction to cause the error-corrected data and the result of the correction to be written in the memory circuit 26.

For writing to and reading from the memory circuit 26, addresses generated in the deinterleaving circuit in association with the data interleaving are selected. The playback audio data $DT_{AD}$ following error detection/correction is read out by the interpolating circuit.

The interpolating circuit executes interpolation by, for example, computing a mean value of data preceding and succeeding the uncorrectable data, and transmits the interpolated data to the playback system of the audio signal converting system as the playback digital data $DT_{OUT}$.

For playback, the audio signal converter 24 includes a digital-to-analog converter and a low pass filter and causes the playback digital data $DT_{OUT}$ to be converted into analog signals for transmitting the produced signals as the playback audio signal $AD_{OUT}$.

The recording track on the magnetic tape 23 is read by means of rotary heads 22A and 22B on the drum 21 to reproduce the data recorded on the magnetic tape 23 to produce the playback audio signals $AD_{OUT}$.

A first embodiment of the DAT to which the rotary head magnetic tape apparatus of the present invention is applied is hereinafter explained.

Figure 2:
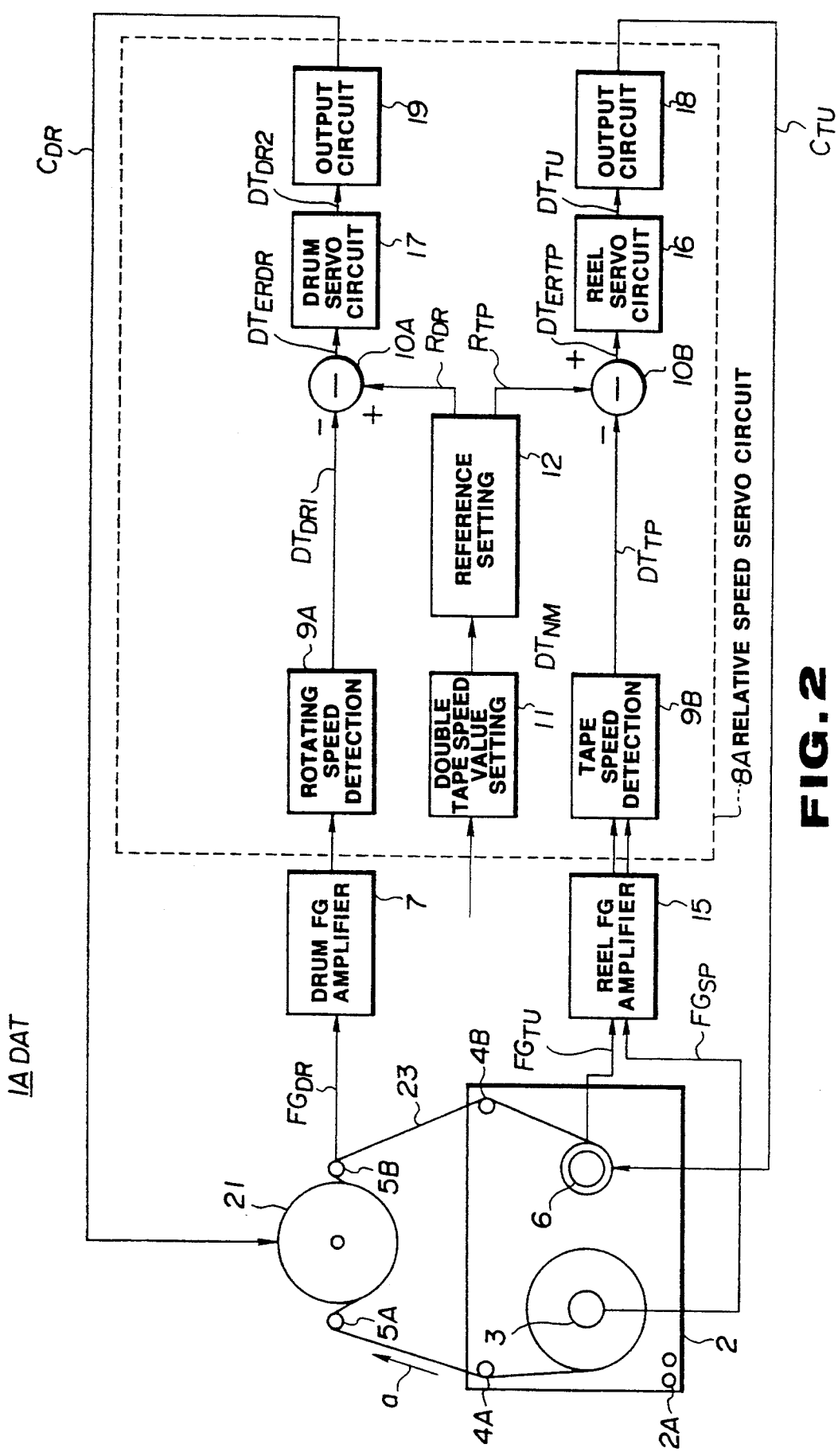
FIG. 2 is a block diagram showing a first embodiment of a rotary head digital tape recorder according to the present invention.

In the following explanation, parts or components corresponding to those shown in FIG. 1 are indicated by the same reference numerals. FIG. 2 shows a DAT 1A of the present invention performing a high-speed search operation. The magnetic tape 23 is extracted by way of a guide shaft 4A from a supply reel 3 of a tape cassette 2 loaded in the DAT, by the operation of a cassette loading mechanism and tape loading mechanism of the DAT 1A, so as to be guided by inclined guides 5A and 5B and taken up at a predetermined wrapping angle on the rotary drum 21.

The magnetic tape 23 is then taken up on a take-up roll 6, by way of a guide shaft 4B. In this manner, the magnetic tape 23 is extracted from tape cassette 2 so as to be loaded with a so-called M loading on the rotary drum 21.

In the first embodiment, the reel shafts of the supply reel 3 and the take-up reel 6 are provided with rotary frequency detectors of a frequency generator configuration and the resulting supply reel frequency signal $FG_{SP}$ and the take-up reel frequency signal $FG_{TU}$ are input via reel FG amplifier 15 to a tape speed detection circuit 9B of a relative speed servo circuit 8A included in a servo circuit 31 of a microcomputer configuration.

Based upon the input supply reel frequency signal $FG_{SP}$ and the take-up reel frequency signal $FG_{TU}$, the tape speed detection circuit 9B detects the period of supply reel rotation $T_{SP}$ and the period of take-up reel rotation $T_{TU}$ and computes the square sum data of the periods of rotation $T_{SP}$ and $T_{TU}$, i.e. ($T_{SP}^2 + T_{TU}^2$). The tape running speed data $DT_{TP}$ composed of the square sum data $T_{SP}^2 T_{TU}^2$ is supplied as a subtraction input to a subtraction circuit 10B.

The rotary drum 21 is also provided with a rotary frequency detection device of a frequency generator configuration and the drum frequency signal $FG_{DR}$ produced thereby is input via drum FG amplifier 7 to a drum period detection circuit 9A of the relative speed servo circuit 8A.

Based upon the input drum frequency signal $FG_{DR}$, the drum period detection circuit 9A detects the period of drum rotation $T_{DR}$, and the drum rotational speed data corresponding to the period of drum rotation $T_{DR}$ is supplied as a subtraction input to a second subtraction circuit 10A.

To the first subtraction circuit 10B and second subtraction circuit 10A, reference tape running speed data $R_{TP}$ and reference drum rotating speed data $R_{DR}$ respectively, are supplied as inputs from a reference value setting circuit 12.

At the time the tape cassette 2 is loaded, based upon tape species data obtained by detecting a tape species detection opening 2A formed on the bottom end of the tape cassette or a double speed value data $DT_N$ input from an externally set tape double speed value setting circuit 11, the reference value setting circuit 12 calculates a reference tape running speed data $R_{TP}$ represented by the formula $$R_{TP} = \frac{4\pi}{(N_M \cdot V_t)^2} (L_0 \cdot D + 2\pi r_0^2) \quad (1)$$

and a reference drum rotational speed data $R_{DR}$ represented by the formula $$R_{DR} = \frac{(\pi \phi / N_D)}{(N-1) \cdot V_t \cdot X + v_D} \quad (2)$$

(where $X = \cos\theta_0 - \sin\theta_0 \cdot \tan(\theta_r - \theta_0)$)

In the above formulas (1) and (2), N denotes the value of the externally set double speed value data $DT_N$, such as the value 100 or 200, $v_t$ denotes the reference running speed of the magnetic tape 23 in accordance with the DAT format, $L_0$ and D denote the overall tape length and the tape thickness, respectively, based on the tape species data obtained from the tape species detection opening 2A and the reel periods, $r_0$ denotes the hub diameter of the supply reel 3 and the take-up reel 6, $\Phi$ denotes the diameter of the rotary drum 21, $N_D$ is the number of teeth of the drum rotational frequency detection unit, $\theta_r$ is the reck angle of the recording track of the magnetic tape 23 in accordance with the DAT format, $\theta_0$ is the still angle, and $v_D$ denotes the reference drum speed when the rotary drum 21 rotates at, for example, 2000 rpm.

The value N of the double speed value data $DT_N$ is a variable as set on the tape double speed value setting circuit 11, while the overall tape length $L_0$ and the tape thickness D are variables which change with the tape species. The reference tape running speed $v_t$, the hub diameter $r_0$ of the supply reel 3 and the take-up reel 6 and the reck angle $\theta_r$ of the recording track are constants as determined in accordance with the DAT format, while the still angle $\theta_0$, diameter $\Phi$ of the rotary drum 21, the number of teeth $N_D$ of the drum rotational frequency detection unit and the reference drum speed $v_D$ are constants which vary with the specific type of DAT.

Thus the first and second subtraction circuits 10B and 10A subtract the tape running speed data $DT_{TP}$ and drum rotating speed data $DT_{DR1}$ from the reference tape running speed data $R_{TP}$ and the reference drum rotational speed data $R_{DR}$, and the results of subtraction, the tape running speed error data $DT_{ERTP}$ and the drum rotating speed error data $DT_{ERDR}$, are input to a reel servo circuit 16 and a drum servo circuit 17, respectively.

The reel servo circuit 16 generates pulse width modulated (PWM) data to correct the tape running speed error data $DT_{ERTP}$, and supplies this PWM data to an output circuit 18 as take-up reel driving data $DT_{TU}$.

The output circuit 18 causes the take-up reel driving data $DT_{TU}$ to be converted into voltage signals and the resulting take-up reel driving signal $C_{TU}$ is fed back to a take-up reel driving motor which drives the take-up reel 6 to maintain the running speed of the magnetic tape 23 at a constant value.

Similarly, the drum servo circuit 17 generates PWM data to correct the drum rotating speed error data $DT_{ERDR}$ and supplies the PWM data to an output circuit 19 as rotary drum driving data $DT_{DR2}$.

The output circuit 19 causes the rotary drum driving data $DT_{DR2}$ to be converted into voltage signals and the resulting rotary drum driving signal $C_{DR}$ is fed back to a drum driving motor which drives the rotary drum 21 to maintain the rotational speed of the rotary drum 21 at a constant value.

Thus the relative speed servo circuit 8A of the first embodiment, based upon the double speed value data $DT_N$ as set from the tape double speed setting circuit 11, the reference tape running speed data $R_{TP}$ and the reference drum rotating speed data $R_{DR}$, controls the take-up reel driving motor and the drum driving motor so that the period of drum rotation $DT_{DR1}$ and the tape running speed data $DT_{TP}$ consisting of the square sum of the period of rotation of supply reel $T_{SP}$ and the period of rotation of take-up reel $T_{TU}$ or ($T_{SP}^2 + T_{TU}^2$) are equal to the reference drum rotating speed data $R_{DR}$ and the reference tape running speed data $R_{TP}$, respectively, so that the relative speed along a track direction between the magnetic tape and the rotary heads 22A and 22B mounted on the rotary drum 21 is controlled to be constant.

Figure 3:
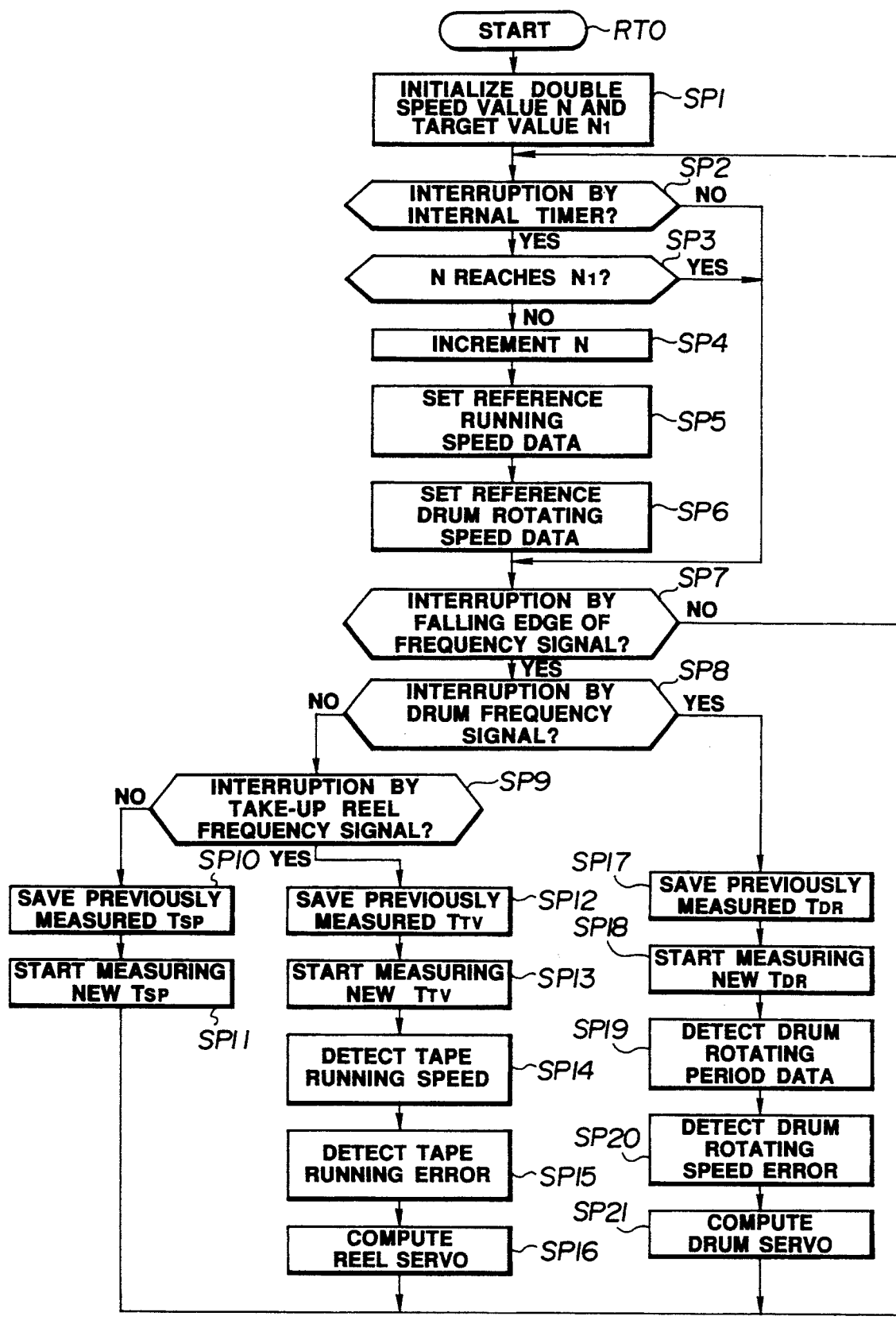
FIG. 3 is a flow chart for illustrating the operation of the digital tape recorder shown in FIGS. 1 and 2.

In the first embodiment, the CPU of the relative speed servo circuit 8A executes a sequence of operations RTO for maintaining this constant relative speed, as shown in FIG. 3A. The CPU of the relative speed servo initiates the relative speed servo control sequence RTO, at the timing of designation of, for example, a high speed search operation, based upon the servo control data $D_{SB}$ supplied from system controller 29. At step SP1, an initial value $N_0$ preset from the tape double speed value setting circuit 11 as the double speed value N, for example, the value 10, is input, as is a target value $N_1$ of the preset double speed value N, for example, the value 100.

At step SP2, the CPU checks to see if an interruption has occurred by an inner timer. If the result is affirmative, the CPU proceeds to step SP3 to check if the double speed value N has reached the target value $N_1$. If the result is negative, the CPU increments the double speed value N at step SP4, after which the CPU proceeds to step SP5.

At step SP5, the CPU controls the reference value setting circuit 12 and, using the double speed value N, sets the reference tape running speed data $R_{TP}$ as determined by the formula (1) above. At step SP6, using the double speed value N, the CPU sets the reference drum rotating speed data $R_{DR}$ as determined by the formula (2) above, after which the CPU proceeds to step SP7.

When a negative result is obtained at the step SP2 or when an affirmative result is obtained at the step SP3, the CPU proceeds directly to step SP7.

At step SP7, the CPU controls the tape speed detection circuit 9B and the drum period detection circuit 9A to see if an interruption has occurred by, for example, the falling edge of the supply reel frequency signal $FG_{SP}$, the take-up reel frequency signal $FG_{TU}$, or the drum frequency signal $FG_{DR}$.

If the result is negative, the CPU returns to step SP2; if the result is affirmative, the CPU proceeds to step SP8 to see if the interruption has been caused by the falling edge of the drum frequency signal $FG_{DR}$. If the negative result is obtained, the CPU proceeds to step SP9.

At step SP9, the CPU checks to see if the interruption has been caused by the take-up reel frequency signal $FG_{TU}$. If the result is negative, the CPU proceeds to step SP10 to save the previously detected period of supply reel rotation $T_{SP}$. At the next step SP11, the CPU starts to measure a new period of supply reel rotation $T_{SP}$ to revert to step SP2.

If the result of step SP9 is affirmative, the CPU proceeds to step SP12 to save the previously detected period of rotation of take-up reel $T_{TU}$ and, at the next step SP13, the CPU starts measuring a new period of rotation of take-up reel $T_{TU}$. At step SP14, using the saved period of rotation of supply reel and take-up reel $T_{SP}$ and $T_{TU}$, the CPU calculates the tape running speed data $DT_{TP}$ represented by the square sum data $T_{SP}^2 + T_{TU}^2$, after which the CPU proceeds to step SP15.

At this step SP15, the CPU controls the tape speed detection circuit 9B, subtraction circuit 10B and the reference value setting circuit 12 to determine the tape speed error data by subtracting the tape running speed data $DT_{TP}$ from the reference tape running speed data $R_{TP}$, and supplies the resulting tape speed error data $DT_{ERTP}$ to a reel servo circuit 16.

At step SP16, the CPU controls the reel servo circuit 16 to correct the speed error data $DT_{ERTP}$. The CPU then causes the resulting take-up reel driving data $DT_{TU}$ to be converted into electrical voltage signals to produce the take-up reel driving signal $C_{TU}$ which is then fed back to the take-up reel driving motor driving the take-up reel 6. The CPU then reverts to step SP2.

If the result at step SP8 is affirmative, the CPU proceeds to step SP17 to save the previously detected period of drum rotation $T_{DR}$. At the next step SP18, the CPU starts measuring a new period of drum rotation $T_{DR}$.

At step SP19, using the saved period of drum rotation $T_{DR}$, the CPU determines the drum rotating speed data $DT_{DR1}$.

At the next step SP20, the CPU controls the drum period detection circuit 9A, subtraction circuit 10A and the reference value setting circuit 12 to determine the rotating speed error data by subtracting the drum rotating speed data $DT_{DR1}$ from the reference drum rotating speed data $R_{DR}$, and supplies the resulting drum rotating speed error data $DT_{ERDR}$ to a drum servo circuit 17.

Finally, at step SP21, the CPU controls the drum servo circuit 17 to correct the drum rotating speed error data $D_{ERDR}$ and causes the resulting drum rotating speed data $DT_{DR2}$ to be converted into a voltage signal, the rotary drum driving signal $C_{DR}$, which is then fed back to the driving motor driving the rotary drum 21. The CPU then reverts to step SP2.

Hence, with the relative speed servo circuit 8A of the present embodiment, the relative speed of the magnetic tape 23 with respect to the rotary heads 22A and 22B on the rotary drum 21 is maintained at a constant value and, by incrementing the double speed value of the magnetic tape stepwise up to the target value, the starting speed of the magnetic tape can be controlled while the relative speed is controlled at the same time to be a constant value at, for example, the starting time of a high speed search operation.

With the above construction, the reference tape running speed data $R_{TP}$ and the reference drum rotating speed data $R_{DR}$ are detected on the basis of the double speed value data $DT_{NM}$ as set from the tape double speed value setting circuit 11, while the take-up reel driving motor and the drum driving motor are controlled so that the tape running speed data $DT_{TP}$, represented by the square sum of the period of supply reel rotation $T_{SP}$ and the period of take-up reel rotation $T_{TU}$, i.e. ($T_{SP}^2 + T_{TU}^2$), and the drum rotating speed data $DT_{DR1}$ are equal to the reference tape running speed data R$_{TP}$ and the reference drum rotating speed data R$_{DR}$, respectively, so that the relative speed of the magnetic tape 23 with respect to the rotary heads 22A and 22B on the rotary drum 21 may be maintained at a constant value.

Also, with the above construction, by incrementing the double speed value of the magnetic tape to a target value in steps, the rotary drum and the magnetic tape can also be accelerated in steps while the relative speed of the magnetic tape 23 and the rotary heads 22A and 22B is controlled to remain constant so that, even during a high-speed search operation, searching and counter display during the high speed search operation may be executed with higher accuracy.

Figure 4:
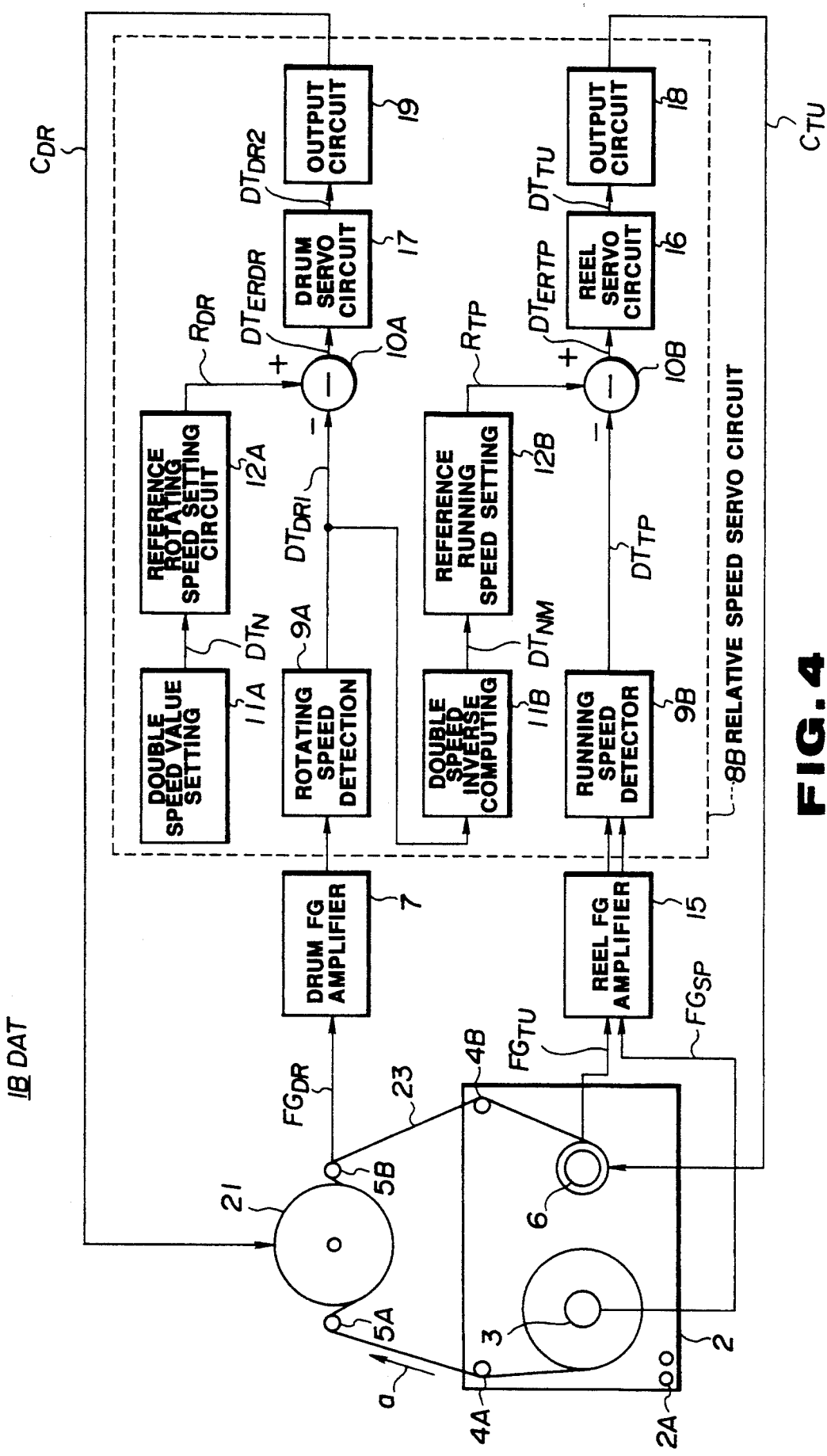
FIG. 4 is a block diagram showing a second embodiment of a digital tape recorder according to the present invention.

A second embodiment of the DAT to which the present invention is applied is hereinafter explained with reference to FIG. 4.

In this DAT 1B, the rotary drum 21 has a rotational frequency detection unit of a frequency generator configuration and the drum frequency signal FG$_{DR}$ produced thereby is input, via drum FG amplifier circuit 7, to a rotational speed detection circuit 9A of a relative speed servo circuit 8B included in the servo circuit 31 in a microcomputer configuration.

Based on the input drum frequency signal FG$_{DR}$, the detection circuit 9A detects the period of drum rotation T$_{DR}$, and the drum rotating speed data DT$_{DR1}$, corresponding to the period of drum rotation T$_{DR}$, is supplied as the subtraction input to first subtraction circuit 10A. The reference rotating speed data R$_{DR}$ is also input to first subtraction circuit 10A from the reference rotating speed setting circuit 12A.

The reference value setting circuit 12A detects, based on the double speed value data DT$_N$ input from the externally set double speed value setting circuit 11A, the reference rotating speed data R$_{DR}$ which is 25 represented by the formula $$R_{DR} = \frac{(\pi\phi/N_D)}{(N-1) \cdot V_t \cdot X + v_D} \quad (2)$$

(where $X = \cos\theta_0 - \sin\theta_0 \cdot \tan(\theta_r - \theta_0)$)

In the above formula, N denotes the value of the externally set double speed value data DT$_N$, such as 100 or 200, $v_t$ is the reference running speed of the magnetic tape 23, $\Phi$ is the diameter of the rotary drum 21, N$_D$ is the number of teeth of the drum rotation frequency sensor, $\theta_0$ and $\theta_r$ denote the still angle and the reck angle, in accordance with the DAT format, of the recording track of the magnetic tape 23, and v$_D$ denotes the reference drum speed in the case of rotation at, for example, 2000 rpm.

It is noted that the value N of the double speed value data DT$_N$ is a variable as set in double speed value setting circuit 11A, the reference tape running speed v$_t$ and the reck angle $\theta r$ of the recording track are constants in accordance with the DAT format, while the diameter $\Phi$ of the rotary drum 21, the number of teeth N$_D$ of the drum rotation frequency sensor and the reference drum speed v$_D$ are constants which change depending on the type of DAT.

The first subtraction circuit 10A subtracts the drum rotating speed data DT$_{DR1}$ from the reference rotating speed data R$_{DR}$ and transmits the thus computed rotational speed error data DT$_{ERDR}$ to drum servo circuit 17.

The drum servo circuit 17 generates pulse width modulation (PWM) data to correct the rotating speed error data DT$_{ERDR}$ and transmits the PWM data as the rotary drum driving data DT$_{DR2}$ to an output circuit 19.

The output circuit 19 converts the rotary drum driving data DT$_{DR2}$ into a voltage signal to produce a rotary drum driving signal C$_{DR}$ which is then fed back to a driving motor driving the rotary drum 21, which maintains the rotary drum 21 at a rotational speed corresponding to the reference rotating speed data R$_{DR}$ as set on the basis of the double speed value data DT$_N$.

The reel shafts of the supply reel 3 and the take-up reel 6 are provided with rotating frequency sensors in a frequency generator configuration, and the supply reel frequency signal FG$_{SP}$ and the take-up reel frequency signal FG$_{TU}$ produced thereby are input via reel FG amplifier circuit 15 to a running speed sensor 9B of the relative speed servo circuit 8B.

Based upon the input supply reel frequency signal FG$_{SP}$ and take-up reel frequency signal FG$_{TU}$, the running speed sensor 9B detects the period of take-up reel rotation T$_{TU}$, and the period of supply reel rotation T$_{SP}$. From these it calculates the square sum of the periods T$_{SP}$ and T$_{TU}$, i.e. (T$_{SP}^2$+T$_{TU}^2$), and the resulting tape running speed data DT$_{TP}$ is supplied as the subtraction input to second subtraction circuit 10B.

The reference running speed data R$_{TP}$ as set by the reference running speed setting circuit 12B on the basis of the double speed value data DT$_{NM}$ input from the inverse double value computing circuit 11b is also supplied to second subtraction circuit 10B.

In the second embodiment, the inverse double speed value computing circuit 11B receives the drum rotating speed data DT$_{DR1}$ from the rotating speed detection circuit 9A and executes an inverse arithmetic operation represented by the formula $$N_M = \frac{1}{V_t \cdot x} \left\{ \frac{(\pi\phi/N_D)}{DT_{DR1}} - V_D \right\} + 1 \quad (4)$$

which has been modified from the formula (2) by substituting the drum rotating speed data DT$_{DR1}$ for the reference rotating speed data R$_{DR}$ of the formula (2) to obtain the double speed value N$_M$ corresponding to the actual rotating speed data DT$_{DR1}$ of the rotary drum 21. This double speed value N$_M$ is transmitted as the inverse double speed value data DT$_{NM}$ to reference running speed setting circuit 12B.

The reference running speed setting circuit 12B then detects, based on the value N$_M$ of the inverse double speed value data DT$_{NM}$, the reference running speed data R$_{TP}$ represented by the formula $$R_{TP} = \frac{4\pi}{(N_M \cdot v_t)^2} (L_0 \cdot D + 2\pi r_0^2) \quad (1)$$

In the formula (1), L$_0$ and D denote the overall tape length and the tape thickness, respectively, which are variables which change with the tape species, and r$_0$ denotes the hub diameter of the supply reel 3 and the take-up reel 6, which are constant based on the DAT format.

The second subtraction circuit 10B then subtracts the tape running speed data DT$_{TP}$ from the reference running speed data R$_{TP}$ and transmits the resulting running speed error data DT$_{ERTP}$ to reel servo circuit 16.

The reel servo circuit 16 generates PWM data to correct the input running speed error data and transmits this PWM data to an output circuit 18 as the take-up reel driving data $DT_{TU}$.

The output circuit 18 converts the take-up reel driving data $DT_{TU}$ into a voltage signal, and the resulting take-up reel driving signal $C_{TV}$ is fed back to a take-up reel driving motor which drives the take-up reel 6 to maintain the magnetic tape 23 at a running speed corresponding to the reference running speed data $R_{TP}$ which is based on the actual rotating speed data $DT_{DR1}$ of the rotary drum 21.

Thus, with the relative speed servo circuit 8B of the second embodiment, the rotary drum 21 is controlled to rotate at a constant rotational speed corresponding to the reference rotating speed data $R_{DR}$ which is based on the preset double speed value, while the magnetic tape 23 is controlled to run at a constant running speed corresponding to the reference running speed data $R_{TP}$ which is based on the actual rotation of the rotary drum 21.

Figure 5:
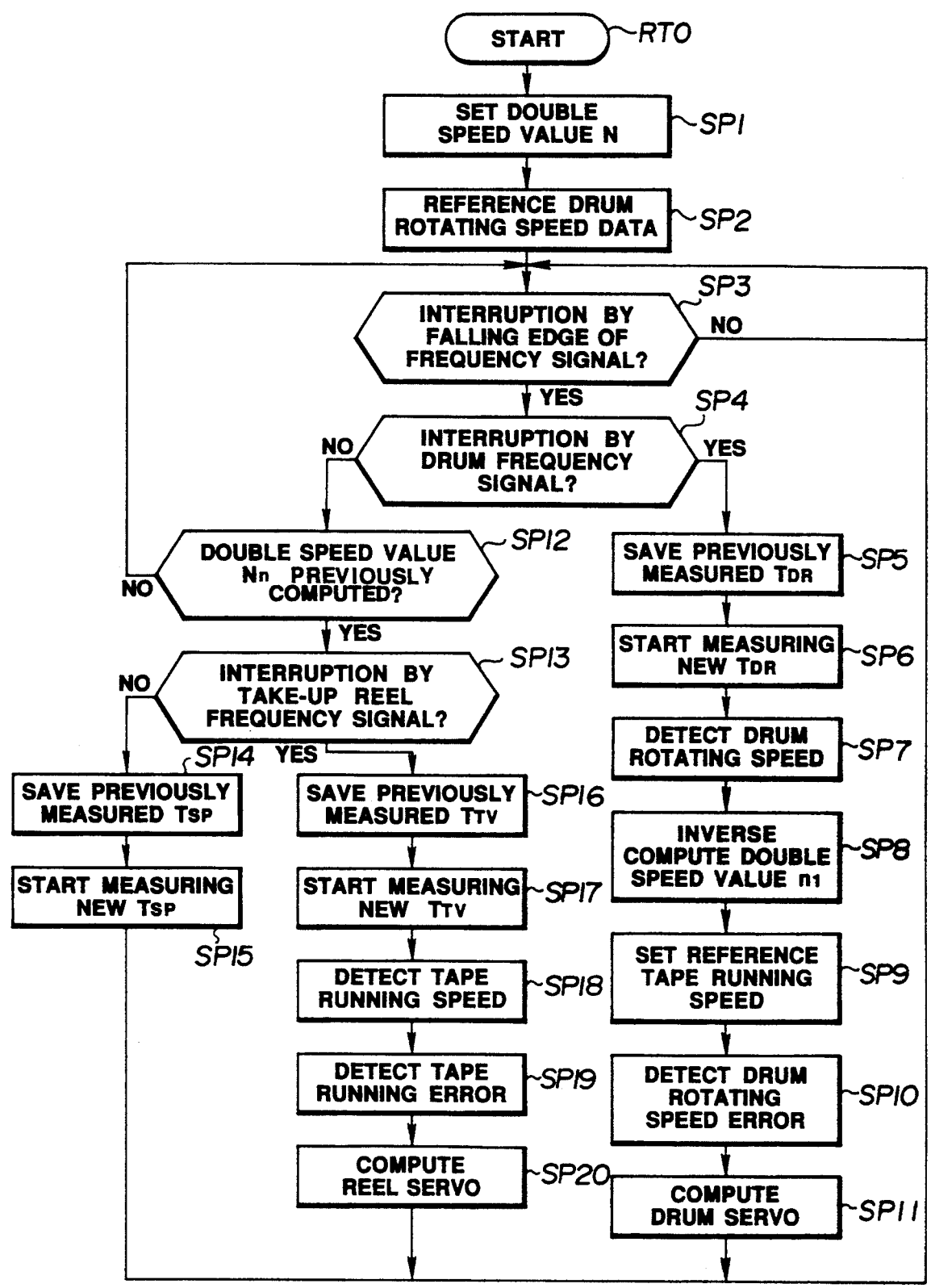
FIG. 5 is a flow chart for illustrating the operation of the digital tape recorder shown in FIG. 4.

In the second embodiment, the CPU of the relative speed servo circuit 8b executes the constant relative speed control sequence RTO shown in FIG. 5 to control the above mentioned relative speed servo operation.

The CPU of the relative speed servo circuit 8B initiates the relative speed servo control sequence RTO at the timing of designation of, for example, a high speed search operation, based on the servo control data $D_{SB}$ input from the system control circuit 29. At step SP1 the double speed value N for the double speed value setting circuit 11A is input.

The CPU then proceeds to step SP2 to control the reference rotational speed setting circuit 12A and, using the double speed value data $ST_N$ input from the double speed value setting circuit 11A, sets the reference drum rotation data $R_{DR}$ as determined by the formula (1), before proceeding to step SP3.

At step SP3, the CPU controls the rotating speed detecting circuit 9A and the running speed detecting circuit 9B to await the occurrence of an interruption by, for example, the falling edge of the drum frequency signal $FG_{DR}$, the supply reel frequency signal $FG_{SP}$, or the take-up reel frequency signal $FG_{TU}$.

Upon detection of the interruption by the falling edge of the frequency signal FG under this state, the CPU proceeds to the next step SP4 and check whether the interruption is caused by the drum frequency signal $FG_{DR}$. If the result is affirmative, the CPU proceeds to step SP5.

At step SP5, the CPU saves the previously measured period of drum rotation T, and, at step SP6, starts measuring a new period of drum rotation $T_{DR}$. At step SP7, using the saved period of drum rotation $T_{DR}$, the CPU detects the drum rotating speed data $DT_{DR1}$.

At step SP8, the CPU controls the inverse double speed value computing circuit lib to compute, using the formula (3), the double speed value $N_M$ from the drum rotating speed data $DT_{DR1}$. At step SP9, the CPU controls the reference running speed setting circuit 12B and computes, using the formula (1), the reference running speed data $R_{TP}$ from the double speed value $N_M$.

Then, at step SP10, the CPU controls the first subtraction circuit 10A to subtract the drum rotating speed data $DT_{DR1}$ from the reference rotating speed data $R_{DR}$ and transmits the resulting rotating speed error data $DT_{ERDR}$ to drum servo circuit 17.

At the step SP11, the CPU controls the drum servo circuit 17 to correct the drum rotating speed error data $DT_{ERDR}$ and sends the resulting rotating drum driving signal $C_{DR}$ back to the rotating drum driving motor driving the rotary drum 21. The CPU then reverts to step SP3.

If the result at step SP4 is negative, the CPU proceeds to step SP12 to see if the double speed value $N_M$ has been computed at the inverse double speed value computing circuit 11B. If this result is negative, the CPU reverts to step SP3, and if the result is affirmative, the CPU proceeds to step SP13.

At step SP13, the CPU checks to see if the interruption has been caused by the take-up reel frequency signal $FG_{TU}$. If the result is negative, the CPU proceeds to step SP14 to save the previously measured period of supply reel rotation $T_{SP}$. At the next step SP15, the CPU starts measuring a new period of supply reel rotation $T_{SP}$, after which the CPU reverts to step SP3.

If the result at step SP13 is affirmative, the CPU proceeds to step SP16 to save the previously measured period of take-up reel rotation $T_{TU}$. At the next step SP17, the CPU starts measuring a new period of take-up reel rotation.

At step SP18, using the saved period of supply reel rotation $T_{SP}$ and period of take-up reel rotation $T_{TU}$, the CPU calculates the square sum data $(T_{SP}^2 + T_{TU}^2)$, and detects the tape running speed data $DT_{TP}$ before proceeding to the next step SP19.

At step SP19, the CPU controls the second subtraction circuit 10B to subtract the tape running speed data $DT_{TP}$ from the reference running speed data $R_{TP}$, and supplies the resulting running speed error data $DT_{ERTP}$ to reel servo circuit 16.

At the final step SP20, the CPU controls the reel servo circuit 16 to correct the running speed error data $DT_{ERTP}$ and sends the resulting take-up reel driving signal $C_{TU}$ to the take-up reel driving motor driving the take-up reel 6 before reverting to step SP3.

In this manner, the above described relative speed servo circuit 8B of the second embodiment causes the magnetic tape 23 to run at a constant running speed so as to follow the actual rotational speed of the rotary drum 21 adapted for rotating at a constant rotational speed corresponding to the preset double speed value. Thus a constant speed of the magnetic tape 23 relative to the rotary heads 22A and 22B may be maintained.

With the above described arrangement, by rotationally driving the drum 21 at a constant rotational speed corresponding to the preset double speed value, and by causing the magnetic tape 23 to run at a constant running speed corresponding to the double speed value obtained by inverse arithmetic operation from the actual rotational speed of the rotary drum 21, the DAT 1B may be so designed that a constant speed of the magnetic tape 23 relative to the rotary heads 22A and 22B on the rotary drum 21 may be maintained.

In addition, with the above described arrangement in which the actual rotational speed of the rotary drum 21 is used as the reference and the running speed of the magnetic tape 23 is controlled so as to follow this reference speed, this constant speed of the magnetic tape 23 relative to the rotary heads 22A and 22B may be maintained despite incidental fluctuations in the rotation of the rotary drum 21.

Further, the constant relative speed may be maintained even during a high speed search operation of the DAT 1B so that counting or searching operations may be executed with higher accuracy.

Figure 6:
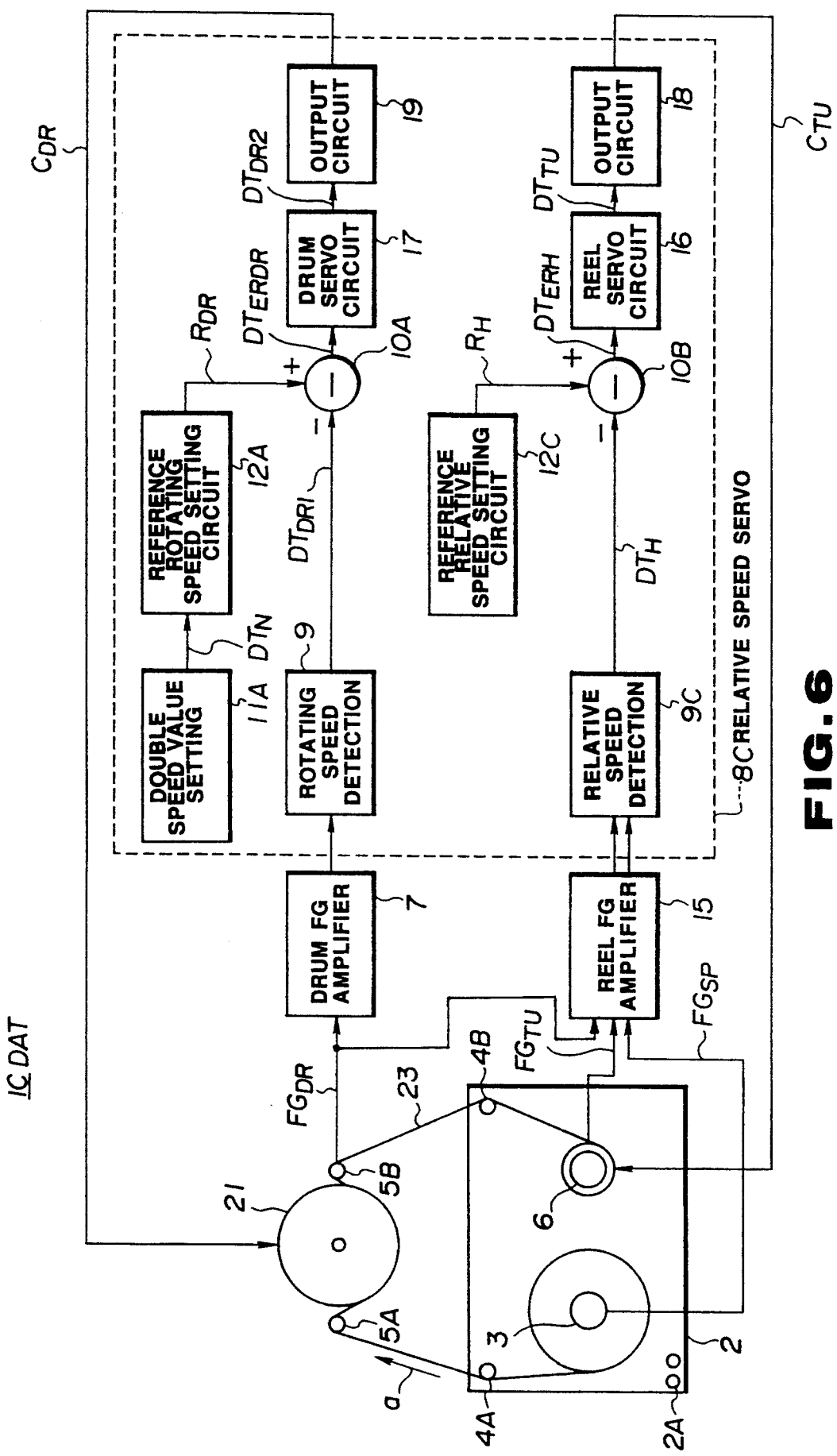
FIG. 6 is a block diagram showing a third embodiment of a digital tape recorder according to the present invention.

A third embodiment of the DAT to which the present invention is applied is hereinafter explained with reference to FIG. 6.

In DAT 1C of the third embodiment, the rotary drum 21 has a rotational frequency detecting device of a frequency generator configuration, and the drum frequency signal $FG_{DR}$ produced thereby is input via drum FG amplifier 7 to a rotating speed detecting circuit 9A of a relative speed servo circuit 8C of a servo circuit 31 in a microcomputer configuration.

Based upon the input drum frequency signal $FG_{DR}$, the detection circuit 9A detects the period of drum rotation $T_{DR}$, and transmits drum rotating speed data $DT_{DR1}$ corresponding to the period of drum rotation $T_{DR}$ to a first subtraction circuit 10A as a subtraction input.

The reference rotating speed data $R_{DR}$ from reference rotating speed setting circuit 12A is also input to the first subtraction circuit 10A.

Meanwhile, the reference rotary speed setting circuit 12A detects, based upon the value N of the double speed value data $DT_N$ input from the externally set double speed value setting circuit 11A, the reference rotating speed data $R_{DR}$ represented by the formula $$R_{DR} = \frac{(\pi\phi/N_D)}{(N-1) \cdot V_t \cdot X + v_D} \quad (2)$$

(where $X = \cos\theta_0 - \sin\theta_0 \cdot \tan(\theta_r - \theta_0)$)

In the above formula (2), N denotes the value of the externally set double speed value data $DT_N$, such as the value of 100 or 200, $v_t$ is the reference running speed of the magnetic tape 23 in accordance with the DAT format, $\Phi$ is the diameter of the rotary drum 21, $N_D$ is the number of teeth of the drum rotational frequency sensor, $\theta_0$ and $\theta_r$ denote the still angle and the reck angle of the recording track, in accordance with the DAT format, and $v_D$ denotes the reference drum speed at, for example, 2000 rpm.

The value N of the double speed value data $DT_N$ is a variable as set by a double speed value setting circuit 11A, the reference type running speed $v_t$, the still angle $\theta_0$ and the reck angle $\theta_0$ of the recording track are constants based on the DAT format, and the diameter $\Phi$ of the rotary drum 21 as well as the number of teeth $N_D$ of the drum rotational frequency sensor and the reference drum speed $v_D$ are constants which vary with the particular DAT.

The first subtraction circuit 10A subtracts the drum rotary speed data $DT_{DR1}$ from the reference rotating speed data $R_{DR}$ and supplies the result, the rotational speed error data $DT_{ERDR}$, to drum servo circuit 17.

The drum servo circuit 17 generates pulse width modulated data or PWM data to correct the rotating speed error data $DT_{ERDR}$, and transmits the PWM data as rotary drum driving data $DT_{DR2}$ to output circuit 19.

The output circuit 19 converts the rotary drum driving data $DT_{DR2}$ into an electrical voltage signal, and the resulting rotary drum driving signal $C_{DR}$ is fed back to the driving motor driving the rotary drum 21, so that the rotary drum 21 is maintained at a rotational speed corresponding to the reference rotational speed data $R_{DR}$ as set on the basis of the double speed value data $DT_N$.

In the third embodiment, the reel shafts of the supply reel 3 and the take-up reel 6 each have a rotational frequency sensor of a frequency generator configuration, and the supply reel frequency signal $FG_{SP}$ and the take-up reel frequency signal $FG_{TU}$ produced thereby are input, along with the drum frequency signal $FG_{DR}$, to a relative speed detection circuit 9C of the relative speed servo circuit 8 via reel FG amplifier 15.

Based upon the supply reel frequency signal $FG_{SP}$, take-up frequency signal $FG_{TU}$ and drum frequency signal $FG_{DR}$, the relative speed detection circuit 9C detects the period of supply reel rotation $T_{SP}$, the period of take-up reel rotation $T_{TU}$ and the period of drum rotation $T_{DR}$.

Using the tape running speed data $DT_{TP}$, obtained from the square sum data $(T_{SP}^2 + T_{TU}^2)$ of the period of supply reel rotation $T_{SP}$ and the period of take-up reel rotation $T_{TU}$, and the period of drum rotation $T_{DR}$, the relative speed detection circuit 9C calculates the actual relative speed data $DT_H$ from the formula $$DT_H = \{(Y \cdot \cos\theta_0 - N_x v_t)^2 + (Y \cdot \sin\theta_0)^2\}^{\frac{1}{2}} \cdot \{\cos(\theta_N - \theta_r)\}$$

where $Y = \dfrac{\phi\pi}{T_{DR} \cdot N_D}$ and $$\theta_N = \tan^{-1}\left(\frac{Y \cdot \sin\theta_0}{\cos\theta_0 - N_x v_t}\right) \text{and}$$

$$N_X = \pm \frac{1}{v_t}\left\{\frac{4\pi (L_0 D + 2\pi r_0^2)^{\frac{1}{2}}}{T_{SP}^2 + T_{TU}^2}\right\} \quad (4)$$

$DT_H$ represents the actual speed of the magnetic tape 23 relative to the rotary drum 21. $DT_H$ is then input to second subtraction circuit 10B.

In the above formula (4), $L_0$ and D denote the tape length and the tape thickness, respectively, which vary with particular tape species, $r_0$ denotes the hub diameter of the supply reel 3 and the take-up reel 6, which is a constant in accordance with the DAT format, and $N_x$ denotes the actual double speed value as found from the period of supply reel rotation $T_{SP}$ and the period of take-up reel rotation $T_{TU}$.

A reference relative speed data $R_H$, preset for each DAT, is also supplied to second subtraction circuit 10B from a reference relative speed setting circuit 12C. The second subtraction circuit 10B subtracts the relative speed data $DT_H$ from the reference relative speed data $R_H$ and transmits the result, the relative speed error data $DT_{ERH}$, to reel servo circuit 16.

Reel servo circuit 16 generates PWM data to correct the input relative speed error data $DT_{ERH}$ and transmits the PWM data as take-up reel driving data $DT_{TU}$ to output circuit 18.

The output circuit 18 causes the take-up reel driving data $DT_{TU}$ to be converted into an electrical voltage signal, and the resulting take-up reel driving signal $C_{TU}$ is fed back to the driving motor driving the take-up reel 6, so that the magnetic tape 23 is maintained at a running speed which is based on the actual relative speed data $D_{TH}$.

In this manner, with the relative speed servo circuit 8C of the third embodiment, by controlling the rotary drum 21 to rotate at a constant rotational speed corresponding to the reference rotational speed data $R_{DR}$ based on the preset double speed value N, and by controlling the magnetic tape 23 to run at a constant running speed corresponding to the actual speed of the magnetic tape 23 relative to the rotary drum 21, a constant speed may be maintained relative to rotary head 21 of the magnetic tape 23.

Figure 7:
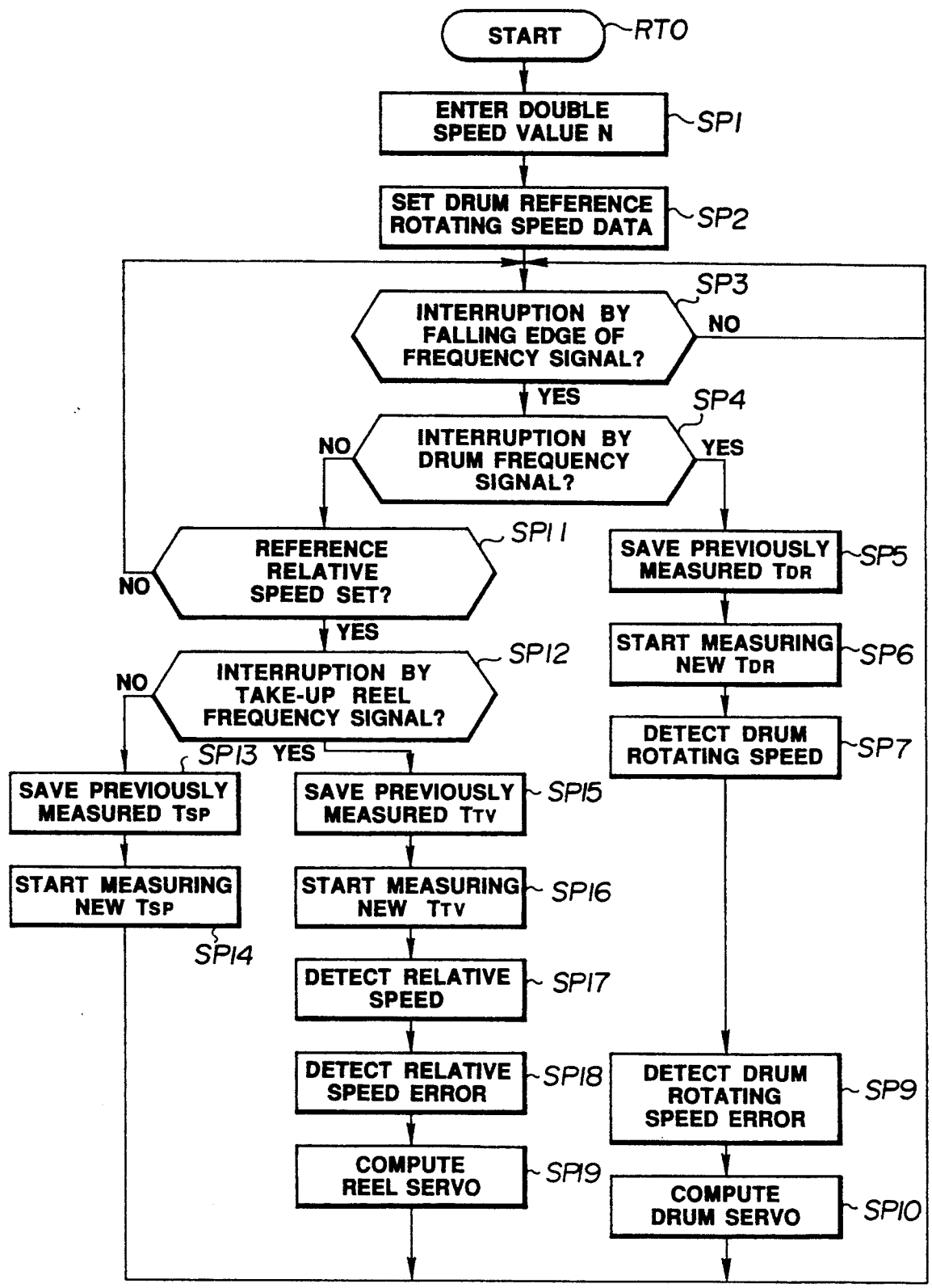
FIG. 7 is a flow chart for illustrating the operation of the digital tape recorder shown in FIG. 6.

In the third embodiment, the CPU of the relative speed servo circuit 8C executes the constant relative speed control sequence RTO shown in FIG. 7 to control the aforementioned relative speed servo operation.

At the step SP1 of the relative speed servo control sequence RTO, which the CPU initiates at the timing of designation of, for example, a high speed search operation, the double speed value N for the double speed value setting circuit 11A is input based upon the servo control data $D_{SB}$ input from the system control circuit 29.

After the double speed value N is input, the CPU proceeds to step SP2 and controls the reference rotational speed setting circuit 12A to set the reference drum rotating speed data $R_{DR}$ mentioned above with reference to formula (2), using the value N of the double speed value data $DT_N$ input from the double speed value setting circuit 11A.

At step SP3, the CPU controls the rotating speed detecting circuit 9 and the relative speed detection circuit 9C to await the occurrence of an interruption by, for example, the falling edge of the drum frequency signal $FG_{DR}$, the supply reel frequency signal $FG_{SP}$ or the take-up reel frequency signal $FG_{TU}$.

Upon detection in this state of an interruption by a falling edge of the frequency signal FG, the CPU proceeds to the next step SP4 and checks whether the interruption has been caused by the drum frequency signal $FG_{DR}$. If the result is affirmative, the CPU proceeds to the next step SP5.

At step SP5, the CPU saves the previously measured period of drum rotation $T_{DR}$ and, at the next step SP6, starts measuring a new period of drum rotation $T_{DR}$.

Using the saved period of drum rotation $T_{DR}$, at step SP7 the CPU detects the drum rotating speed data $DT_{DR1}$ before proceeding to the next step SP9.

At step SP9, the CPU controls the first subtraction circuit 10A to subtract the drum rotating seed data $DT_{DR1}$ from the reference rotating speed data $R_{DR}$, and supplies the resulting rotating speed error data $DT_{ERDR}$ to drum servo circuit 17.

At step SP10, the CPU controls the drum servo circuit 17 to correct the rotating speed error data $DT_{ERDR}$ and sends the resulting rotating drum driving signal $C_{DR}$ back to the driving motor driving the rotary drum 21 before returning to step SP3.

If the result of decision at the step SP4 is negative, the CPU proceeds to step SP11 to determine if the reference relative speed has already been set. If the result at step SP11 is negative, the CPU reverts to step SP3 and, if affirmative, the CPU proceeds to step SP12.

At step SP12, the CPU checks to see if an interruption has been caused by the take-up reel frequency signal $FG_{TU}$. If the result is negative, the CPU proceeds to step SP13 to save the previously measured period of supply reel rotation $T_{SP}$ and starts measuring a new period of supply reel rotation $T_{SP}$ at the next step SP14. The CPU then returns to step SP3.

If the result at step SP12 is affirmative, the CPU proceeds to step SP15 to save the previously measured period of take-up reel rotation $T_{TU}$ and starts measuring a new period of take-up roll rotation $T_{TU}$ at the next step SP16.

At step SP17, the CPU controls the relative speed detection circuit 9C and, using the formula (2), detects the relative speed data $DT_H$ based on the drum frequency signal $FG_{DR}$, supply reel frequency signal $FG_{SP}$ and the take-up reel frequency signal $FG_{TU}$, before proceeding to step SP18.

At step SP18, the CPU controls the second subtraction circuit 10B to subtract the relative speed data $DT_H$ from the reference relative speed data $R_H$, and supplies the produced relative speed error data $DT_{ERH}$ to reel servo circuit 16.

Finally, at step SP19, the CPU controls the reel servo circuit 16 to correct the relative speed error data $DT_{ERH}$ and sends the resulting take-up reel driving signal $C_{TU}$ back to the motor driving the take-up reel 6. The CPU then returns to step SP3.

Thus, with the relative speed servo circuit 8C of the present third embodiment, by detecting the actual relative speed from the actual period of rotation of the rotary drum 21 rotating at a constant rotational speed corresponding to the preset double speed value, the supply reel period and the take-up reel period, and by controlling the take-up reel 6 to cause the magnetic tape 23 to run at a speed relative to the magnetic heads 22A and 22B which is equal to the preset reference relative speed, a constant speed of the magnetic tape 23 relative to the rotary heads 22A and 22B may be maintained.

With the above arrangement, by driving the rotary drum 21 at a constant rotational speed corresponding to the preset double speed value, and by causing the magnetic tape 23 to run at a speed at which the actual speed of the magnetic tape 23 relative to the rotary drum 21 is equal to the reference relative speed corresponding to the double speed value, the DAT 1C allows a constant speed of the magnetic tape 23 relative to the rotary heads 22A and 22B on the rotary drum 21 to be maintained.

With the above arrangement, by using the actual rotational speed of the rotary drum 21 as a reference, and controlling the running speed of the magnetic tape 23 in accordance with the relative speed obtained in this manner, the relative speed of the magnetic tape to the rotary heads 22A and 22B on the rotary drum 21 may be maintained at a constant value despite incidental fluctuations in the rotation of the rotary drum 21.

In this manner, a constant relative speed may be maintained even during a high-speed search operation of the DAT 1, so that searching or counting operations may be achieved with higher accuracy.

What is claimed is:

1. A rotary head type magnetic tape apparatus in which a magnetic tape is wrapped around a rotary drum fitted with a rotary head or heads and desired information signals may be recorded on or reproduced from said magnetic tape by the rotary head or heads, comprising:

first reference value setting means for setting first reference head rotating speed data based upon preset tape speed data;

rotating speed detecting means for detecting the rotational speed of the rotary drum and generating head rotating speed data;

second reference value setting means for setting first reference tape running speed data based upon the inverse of the head rotating speed data;

tape running speed detecting means for generating tape running speed data;

rotational driving means for driving the rotary head or heads;

tape driving means for driving the magnetic tape;

first rotary head controlling means for controlling the rotational driving means so that the head rotating speed data and the first reference head rotating speed data are equal to each other, and first magnetic tape running control means for controlling the tape driving means so that the tape running speed data and the first reference tape running speed data are equal to each other, such that the relative speed along a track direction between the magnetic tape and the rotary head or heads mounted on the rotary drum is controlled to be constant.

2. A rotary head type magnetic tape apparatus in which a magnetic tape from a supply reel is wrapped around a rotary drum, fitted with at least one rotary head, and taken up on a take-up reel, comprising:

frequency detection means for detecting the frequency of the supply reel, the take-up reel, and the rotary drum, and generating a supply reel frequency signal, a take-up reel frequency signal, and a drum frequency signal, the frequency detection means including a rotary drum speed detecting means for generating head rotating speed data;

tape running speed detection means for calculating supply reel period data and take-up reel period data on the basis of the supply reel frequency signal and the take-up reel frequency signal, respectively, and for calculating tape running speed data by computing the square sum data of the supply reel period data and the take-up reel period data, tape speed reference value setting means for supplying reference tape running speed data based upon the characteristics of the magnetic tape and preset tape speed data, drum speed reference value setting means for setting reference drum rotating speed data based upon the preset tape speed data;

error detection means for computing tape running speed error data by comparing the tape running speed data to the reference tape running speed data, and for computing drum rotating speed error data by comparing the drum frequency signal to the reference drum rotating speed data;

take-up reel driving means for driving the take-up reel in a controlled manner based upon the tape running speed error data; and rotary drum driving means for driving the rotary drum in a controlled manner based upon the drum rotating speed error data;

such that the relative speed along a track direction between the magnetic tape and the at least one rotary head mounted on the rotary drum is controlled to be constant; and wherein:

the rotary drum speed detecting means includes drum rotational detection means having a predetermined number ($N_D$) of teeth, the drum speed reference value setting means outputs reference drum rotating speed data $R_{DR}$ according to the formula:

$$R_{DR} = \frac{(\pi\phi/N_D)}{(N-1) \cdot V_t \cdot X + V_D}$$

and the tape speed reference value setting means outputs reference tape running speed data $R_{TP}$ according to the formula:

$$R_{TP} = \frac{4\pi}{(N_M \cdot V_t)^2} (L_0 \cdot D + 2\pi r_0^2)$$

where:

$$N_M = \frac{1}{V_t \cdot X} \left\{ \frac{(\pi\phi/N_D)}{DT_{DR1}} - V_D \right\} + 1$$

and $V_t$ denotes a predetermined reference running speed of the magnetic tape in accordance with a conventional DAT format, $L_0$ and $D$ denote an overall tape length and a tape thickness, respectively, $r_0$ denotes a hub diameter of the supply reel and the take-up reel, $\Phi$ denotes a diameter of the rotary drum, $N_D$ is the number of teeth of the drum rotational frequency detection means, $\theta_r$ is a reck angle of the recording track of the magnetic tape in accordance with the conventional DAT format, $\theta_0$ is a still angle, $V_D$ denotes a predetermined reference drum speed when the rotary drum rotates at a predetermined speed, $DT_{DR1}$ is an actual rotating speed data of the rotary drum, and $X = \cos\theta_0 - \sin\theta_0 \cdot \tan(\theta_r - \theta_0)$.

* * * * *